Patented June 25, 1946

2,402,779

UNITED STATES PATENT OFFICE 2,402,779

PLASTER BANDAGE

John F. Ryan, Walpole, Mass., assignor to The Kendall Company, Boston, Mass., a corporation of Massachusetts No Drawing. Application June 11, 1942, Serial No. 446,596

15 Claims. (Cl. 128—91)

This invention relates to plastic bandages for surgical and orthopedic application, and more particularly relates to improved and novel plaster bandages, cementitious compositions, and plaster casts prepared therefrom which have marked deodorizing power and provide greater coolness and comfort as the result of ready permeability to air and moisture. From psychological, hygienic and therapeutic considerations, these properties are obviously desirable to orthopedic surgeons and to all who have occasion to apply or to wear a plaster cast. These improvements are accomplished by incorporating in the plaster, or a portion thereof, an adsorbent material having the characteristics hereinafter described, without the introduction of chemically active agents, and without interfering with normal useful properties of the bandage.

Plastic bandages are often applied over wounds which develop an odorous suppuration which saturates the cast causing the emission of foul and disagreeable odors that distress the patient and those who have occasion to approach him and which, in combination with normal excretions of the skin, cause the cast to become impermeable to air and moisture, thus raising the skin temperature and providing conditions unfavorable to rapid healing of the wound and uncomfortable for the patient.

An object of this invention is to provide greatly improved plaster of Paris bandages, from which casts may be prepared, which have high deodorizing capacity and substantial permeability to air and moisture and which are free from the objectionable features of the casts now in use.

Another object of the invention is to provide such a bandage without effecting any substantial decrease in the normal wetting rate, workability or setting time of the bandage, or in the strength-when-set of a cast prepared from the bandage. A further object of the invention is to provide a cementitious composition from which such a bandage may be prepared. Further objects and advantages of the invention will appear more in detail hereinafter.

I have discovered that greatly improved plaster of Paris bandages having the desirable properties of deodorizing power, porosity and coolness, and an acceptable wetting rate, setting time, workability and entirely adequate strength-when-set, may be prepared from a cementitious composition having therein an appropriate amount of activated carbon of the proper particle size, purity and activation history. Moreover, the invention is applicable to either the so-called "loose plaster" bandage wherein a plaster formulation is rubbed in the dry state into the meshes of a fabric, or to the "hard coated" type of bandage where the formulation is dried onto the fabric out of a liquid suspension and in the presence of a binder.

The preparation of a satisfactory supportive plaster cast involves the choice of a plaster composition of controlled properties as a starting material, as well as diligent attention to the actual formation of the cast from wet-out bandages. The compounding of bandages which will have the proper wetting rate, setting time, and strength-when-set is a highly technical art. Small amounts of impurities in the plaster may accelerate or decelerate its setting time, or impair the strength of the final cast, so as to render such plaster unfit for orthopedic purposes, and, in work done in connection with the present invention, I have found this to be especially true in the incorporation of a deodorizing adsorbent in a plaster formulation. Considering the sensitivity of plaster formulations to impurities, it is remarkable that I am able to introduce relatively large and adequate amounts of a foreign pulverulent adsorbent material without destroying the cast-forming properties of the plaster. Even more unexpected is the fact that the effectiveness of my adsorbent material is retained to exert its deodorizing power in the resultant cast despite being incorporated in a hardened matrix of plaster which otherwise would be dense and substantially impermeable.

In many types of operations, a plaster cast must be applied over a site where the skin has been broken, as in compound fractures. Due to the difficulty of maintaining antiseptic conditions under a cast, some degree of infectious process with the development of odorous suppuration, is frequently met with in cases of this type. For example, in cases of osteomyelitis, a plaster cast is often applied over a suppurating cavity, ulcer, or draining sinus, whereby odorous matter is discharged and contaminates the cast. Again, in the treatment of traumatic injuries by the so-called "closed plaster" technique, initial debridement and packing of the wound is followed by complete immobilization of the infected part by the use of plaster of Paris bandages.

In all of these cases, more or less decomposition of body tissue is a natural and expected sequel, resulting in the formation of purulent matter which imparts a very foul odor to the cast. This occurs within a very few days after application of the cast and endures until the cast is removed and the skin is cleansed, which may be weeks later. During this time the odor is steadily diffused into the atmosphere around the patient. It is a source of distress, reaching the point of nausea, not only to the patient but to those who come in contact with him. The odor may become so revolting that the patient loses appetite and even one such patient in a ward may be a source of distress and complaint on the part of other patients. The problem is recognized by orthopedic surgeons as one of the chief disadvantages in the application of rigid bandages over the site of an active or potential infection.

In attempting to control the odor developed where rigid casts are applied over a suppurative process, hospitals have resorted to many devices such as the use of ozone machines near the patient's bed; vacuum hose attachments to remove the air circulating around the cast; and masking of the foul odor by aromatic mixtures. None of these devices is satisfactory. I have found that a cast prepared from an activated carbon-plaster composition made in accordance with this invention is extremely effective in preventing the emission of foul odors when applied over such an infection for as long as a cast is necessary. This efficient deodorizing action is accomplished without sacrificing the strength of the set plaster composition, and without interfering with the normal workability of the wet-out bandage.

It is well known that an ordinary plaster of Paris cast is relatively impervious to air and moisture. A newly made clean, dry cast will absorb and transmit a limited amount of water, but under conditions of actual use, even on unbroken skin, the permeability of a cast rapidly decreases. This is due to the deposition on the inside of the cast of a waxy layer of waste products from the skin, and consisting of sebum, fatty matter, residues from perspiration, etc. Thus the cast, only slightly porous to begin with, rapidly becomes impermeable. The skin underneath the cast is surrounded by a stagnant layer of most air, skin infection and irritation is encouraged, the patient complains of pruritus, and on removal of the cast, it is found that the underlying tissue has an unhealthy macerated appearance.

Casts prepared from the composition disclosed in this invention are markedly superior to the casts now in use in this respect. The initial porosity of a cast prepared in accordance with this invention may be more than double the porosity of a plain plaster cast of equal thickness and this porosity is maintained for a substantial period under adverse conditions of excreted waste from the skin and from wounds. Due to the peculiar adsorptive capacity of the active ingredients in this composition, waste products reaching the inner cast surface are selectively adsorbed in discrete zones so that an impermeable waxy film is not formed.

A third advantage possessed by this improved composition is that casts prepared therefrom are cooler to the touch and feel cooler on the body than casts prepared from regular plaster of Paris. The improved casts radiate the body heat more readily and temperature measurements indicate that the temperature near the skin may be as much as two degrees Fahrenheit cooler than when an equal thickness of regular plaster of Paris is applied. This results in a more optimum skin temperature, decreased perspiration, decreased itching and greatly increased comfort to the person wearing the cast.

The use of activated carbon in a plaster of Paris cast results in some degree of interference with the formation of the crystalline gypsum matrix to which a finished cast owes its strength and rigidity. To this extent, the incorporation of activated carbon results in a cast which is not quite so strong as a cast made from plaster alone. However, since plaster casts when properly made commonly have strength far in excess of that which is necessary, I have found that the decrease in strength is not important provided it is minimized by the proper selection of activated carbon in accordance with this invention.

In the preferred practice of this invention, casts are made from mixtures of plaster and activated carbon containing from any effective amount of activated carbon up to an average of 12 of activated carbon by weight of the aggregate amount of plaster and activated carbon in the entire bandage, though the range may be considerably extended, even up to an average of 25% by weight of said aggregate amount, particularly if there be high-strength portions of lower activated carbon content. This extreme figure gives a granular cast which is rather friable, and not suited to be used alone in the construction of a cast where strong support is necessary. However, the use of such a high ratio activated carbon composition may have advantages in cast preparation where bandages of such composition are alternated or laminated with bandages of low activated carbon content or no activated carbon at all. Excellent results are obtained where a plaster bandage containing a high percentage of activated carbon concentrated or localized in a certain zone or layer, which alone would give a cast having rather low crushing strength, is applied immediately over the sheet wadding wrapped around a fractured limb. This is then covered by several ordinary plaster bandages containing no carbon. In this manner, satisfactory immobilization is obtained as well as excellent control of odor and skin conditions, though with somewhat less porosity than is obtained by the use of a homogeneous-mix bandage.

An activated carbon-plaster cast may be prepared by the use of uniform low activated carbon content bandages throughout, or by alternating higher activated carbon content bandages with plain plaster bandages, or by applying several plain plaster bandages over a layer of bandages containing, say, 20 to 40% or more, of activated carbon. The choice of technique will depend upon the type of cast and the preference of the surgeon. In general, however, it is simpler to work with a single type of bandage, since less attention must be paid to working the various layers together while moist, for the purpose of preventing delamination; and because bandages of one type will have the same handling properties and setting time. In ascribing preferred limits hereinafter to the percentage of activated carbon to be incorporated with plaster of Paris in the practice of this invention, I refer to the results to be obtained when a cast is to be built solely of the single or homogeneous-mix type bandages, with the understanding that it may be advantageous for certain purposes and objects to deviate from this procedure and concentrate more of the activated carbon in a certain layer or portion of the cast.

In the preparation of a cementitious composition for use in preparing casts comprising homogeneous-mix type bandages, a plaster of Paris composition is mixed with the desired amount of activated carbon, usually from 2 to 12% of the total weight of the mix. For best results, I prefer to use a mixture of two or more types of activated carbon, although a satisfactory composition can be prepared using only one type of activated carbon. It has been found that for maximum deodorizing power and strength and minimal interference with the normal working properties of the plaster bandage, the activated carbon or activated carbons should be carefully selected as to neutrality, freedom from excess soluble ash or other soluble impurities, proper activation, and correct mesh or particle size.

The following example illustrates a most satisfactory method of practicing this invention. Two parts by weight of Nuchar T, 2 parts of Nuchar C, and one part of Nuchar FAN are thoroughly mixed with 95 parts of plaster of Paris of orthopedic grade. Nuchar C, Nuchar T, and Nuchar FAN are commercial grades of activated carbon which exhibit varying adsorptive capacities for different odorous components of the odorous complex in a suppurating wound. The above mixture forms a cementitious composition which sets into a hard, rigid mass when moistened with water. The setting time of this composition varies from 8 to 25 minutes depending upon the characteristics of the plaster of Paris used and the degree of crystal formation. This composition may be used in preparing either loose plaster bandages or hard plaster bandages.

In preparing a loose plaster bandage a strip of fabric, preferably a crinoline such as is described in U. S. Patent No. 2,195,342, issued to Raymond E. Reed, March 26, 1940, is unrolled onto a smooth, dry surface. A liberal supply of the activated carbon-plaster composition is smoothed over the fabric to a thickness of, say, $\frac{1}{16}$". Beginning at the end of the strip, the composition is rubbed into the fabric and the excess composition is worked off to the side of the strip. When the composition is completely rubbed into the fabric, the strip is loosely rolled up and a new length of fabric is exposed and impregnated with the composition. This procedure is repeated until the bandage is of suitable length. The product thus prepared may be wetted with water and applied to the patient as desired by the attending physician.

A hard plaster bandage is prepared by following the usual and well-known technique for making such bandages except that the activated carbon-plaster composition is substituted for the plain plaster used heretofore. Thus, suitable portions of water, a binding agent, an accelerator, a retarder, and the activated carbon-plaster composition are mixed together and spread onto a strip of suitable thin, flexible reinforcing material, for example, textile fabric, perforated water-resistant paper, or other sheet product, by suitable spreading equipment, and dried. The product thus prepared may be stored until desired for use by the attending physician who will wet the same with water and apply it to the patient. A satisfactory formulation for the bandage just referred to consists of:

Activated carbon-plaster composition

| | | |
|---|---|---|
| | gram__ | 200 |
| Starch } binder materials ____do____ | | 1⅓ |
| Glucose } | | 30 |
| Alcohol (retarder) _____cc__ | | 40 |
| Water _____do__ | | 50–100 |
| K₂SO₄ (accelerator)_____gram__ | | 1 |

The magnitude of the portions of accelerator and retarder may be varied so as to obtain desired spreading and drying conditions and setting time.

Bandages prepared in this manner I have found to possess substantially the same workability, wetting rate, and setting time as plain plaster bandages and are subject to the same factors affecting these properties as are the plain plaster bandages. These bandages are useful in preparing casts in accordance with the well-known procedure utilized in preparing casts from plain plaster bandages and the same precautions which are now used should be exercised in preparing casts from the bandages described herein. Thus, by my practice, a cast having the novel characteristics of deodorizing capacity and porosity may be prepared from bandages made in accordance with this invention and used in orthopedic treatment.

My preference for using a mixture of carbons of different activation histories in my carbon-plaster composition is based on the fact that a more complete removal of odor is effected thereby than when a single type of activated carbon is used. I have found a high degree of specificity exists in the behaviour of different activated carbons in adsorbing different fractions of what might be called the "odor complex" arising from suppurating animal matter. This odorous complex is a mixture of many individual odorous compounds, a partial list of which would include hydrogen sulfide, ammonia, primary amines, polyamines such as the ptomaines, protein decomposition products such as skatole and other indol bodies, odorous fatty acids such as butyric, caproic and valeric, and numerous amino acids and organic sulfur compounds. I have found, for example, that one type of activated carbon which is very efficient in removing the odor of skatol from aqueous solution may have very little effect on the equally disagreeable odor of putresceine. The nature of the odorous complex will vary with the nature of the particular tissue or organ undergoing decomposition and with other factors such as the pH at which decomposition is taking place and the nature of the infectious organism. By using a mixture of activated carbons, each of which has a special affinity for one or more of the various classes of compounds making up the odor complex, a much more thorough degree of deodorization is assured.

A second factor which I have found to be important in the practice of this invention is the purity of the activated carbon. Some commercial activated carbons have as high as 30% ash content, consisting of inorganic salts; even though these salts are of limited solubility, their presence may interfere with the normal working properties of the plaster with which the activated carbon is mixed. In this invention, those activated carbons are preferably chosen which have an ash content of 10% or less. This is further reduced, if desired, by washing the activated carbon with such reagents as dilute hydrochloric acid, followed by water washing and drying. Therefore, in formulating mixtures of activated carbon and plaster of Paris, I prefer to use those activated carbons which I have found to have the least deleterious effect on the working properties of the plaster, and to purify the activated carbon further if necessary so that the addition of a small amount of accelerator or retarder, as is common in plaster formulations, will result in a composition having substantially the same setting time and working properties as shown by the plaster when not mixed with activated carbon. I have found this standardization of ash content and purity of activated carbon to be very important in the preparation of a composition of uniform and reliable working properties.

Another factor of importance in the preparation of cementitious compositions of this type is the pH of the water extract of the activated carbon, since it is an indication of the pH surrounding the activated carbon particles in the set cast. The adsorptive activity of the carbon, I have found, is greatest at a pH of between 6 and 8. This accounts for the fact that so-called "acid" or "alkaline" carbons show a definitely decreased adsorptive power for almost all of the odorous ingredients in what I have referred to as the odor complex. By controlled experiments with activated carbon buffered to a definite pH, I have found that, using a single type of activated carbon as starting material, a decrease in adsorptive activity of over 50% may result at a pH below 4 or over 10. This optimum activity around pH 7 may be connected with the amphoteric nature of many of the ingredients in the odor complex. Whatever its cause, in this invention those activated carbons are preferably used which are essentially neutral—that is, with a water extract of pH 6 to 8.

The selection of a proper particle size for the activated carbon is important in the successful formulation of a deodorizing plaster composition. I have found, for instance, that a plaster of Paris cast containing a given proportion by weight of activated carbon having a particle size which will just pass through a 25-mesh screen will have only about one-eighth the deodorizing capacity of a similar plaster of Paris cast containing the same proportion of activated carbon having a particle size which will pass through a 150-mesh screen. Thus, a formula of five parts of 150-mesh activated carbon plus 95 parts of plaster has a deodorizing potential equal to a mixture of 40 parts of 25-mesh activated carbon plus 60 parts of plaster. Whereas the former composition will form a rigid cast of high strength-when-set, the latter composition when set is a porous friable mass, easily crumbled by hand and entirely unsuited to orthopedic work. Acceptable deodorizing efficiency may be obtained by using activated carbons as coarse as 100-mesh, but below this figure the efficiency drops off rapidly. For greatest deodorizing power, therefore, I prefer to employ activated carbon of particle size finer than 100-mesh.

It should be clearly understood from the foregoing description that the limits set forth herein respecting particle size of the activated carbon, the quantities of soluble ash present, the pH of the water extract, and the proportion of activated carbon present in the plaster formulation are found more desirable due to the effect of these factors on the wetting rate, workability, setting time and strength-when-set, though improved and satisfactory bandages having desirable therapeutic effects, deodorizing capacity, coolness and comfort, by reason of their ready permeability to air and moisture, may be prepared from compositions varying from the preferred limits in one or more respects set forth herein.

What I claim is:

1. A plaster bandage cementitious composition of the character described comprising a substantially dry mixture including plaster of Paris and activated carbon, the water extract of said carbon having a pH of not less than 4 nor more than 10, and said mixture, when moistened with water, being capable of hardening into a rigid mass having high deodorizing capacity and substantial permeability to air and moisture.

2. A plaster bandage cementitious composition of the character described comprising a substantially dry mixture including plaster of Paris and activated carbon, the water extract of said carbon having a pH of not less than 4 nor more than 10, and the proportion of activated carbon present in the composition being 12% or less by weight, said mixture having high deodorizing capacity and, when moistened with water, being capable of hardening into a rigid mass having substantial permeability to air and moisture.

3. A plaster bandage cementitious composition having deodorizing characteristics comprising plaster of Paris and fine particles of activated carbon, the major portion of said carbon being of a particle size passing a 100-mesh screen.

4. A plaster bandage cementitious composition having deodorizing characteristics comprising plaster of Paris and activated carbon, said activated carbon containing 10% or less by weight soluble inorganic ash.

5. A plaster bandage cementitious composition having deodorizing characteristics comprising fine particles of activated carbon the major portion of which pass a 100-mesh screen, and plaster of Paris, said activated carbon containing 10% or less by weight soluble inorganic ash and comprising 12% or less by weight of the composition.

6. A rigid plaster cast substantially capable of adsorbing odors emitted from the body to which it is applied and having substantial permeability to air and moisture comprising a thin reenforcing element carrying a mixture composed essentially of hydrated plaster of Paris and a substantial and effective amount of activated carbon, the strength of the cast being sufficient to immobilize the body.

7. A rigid plaster cast having high deodorizing capacity capable of maintaining the skin temperature of the body beneath the bandage substantially lower than the skin temperature beneath a plain plaster bandage comprising a thin fabric element, hydrated plaster of Paris and activated carbon, the strength of the cast being sufficient to immobilize the body.

8. A rigid plaster cast having high deodorizing capacity and substantial permeability to air and moisture comprising a matrix having dispersed therein fine particles of activated carbon the majority of which particles pass a 100-mesh screen, said matrix comprising a thin fabric element and a deodorizing composition consisting of hydrated plaster of Paris and said activated carbon in quantities of 12% or less by weight of the matrix, the strength of the cast being sufficient to immobilize the body.

9. A rigid plaster cast having high deodorizing capacity comprising a laminated structure of intermittently arranged hydrated layers, one of said layers consisting essentially of a thin fabric element and plaster of Paris and another of said layers comprising a thin fabric element and a mixture of plaster of Paris and activated carbon, the water extract of said carbon having a pH of not less than 4 nor more than 10, and the strength of the cast being sufficient to immobilize the body.

10. An orthopedic bandage suitable for use in making orthopedic casts having high deodorizing capacity and substantial permeability to air and moisture comprising a textile fabric having adherent thereto a deodorizing cementitious composition comprising plaster of Paris, activated carbon and a binding agent, said cementitious composition having an acceptable wetting rate and workability.

11. An orthopedic bandage suitable for use in making orthopedic casts having high deodorizing capacity and substantial permeability to air and moisture comprising a textile fabric and a cementitious composition, said cementitious composition having an acceptable wetting rate and workability and comprising plaster of Paris and activated carbon.

12. An orthopedic bandage suitable for use in the preparation of an orthopedic cast of sufficient strength to immobilize the portion of the body enclosed therein comprising a thin, flexible reinforcing material and a substantially dry mixture including plaster of Paris and activated carbon, said mixture, when moistened with water having an acceptable wetting rate, workability, and setting time, and being capable of hardening into a rigid mass having high deodorizing capacity and substantial permeability to air and moisture.

13. An orthopedic bandage suitable for use in making orthopedic casts having a high deodorizing capacity and substantial permeability to air and moisture, comprising a textile fabric having adherent thereto a deodorizing cementitious composition comprising plaster of Paris, activated carbon, and a binding agent, the water extract of said activated carbon having a pH of not less than 4 nor more than 10, and said cementitious composition having acceptable wetting rate and workability.

14. An orthopedic bandage suitable for use in making orthopedic casts having high deodorizing capacity and substantial permeability to air and moisture, comprising a textile fabric and a cementitious composition, said cementitious composition having an acceptable wetting rate and workability and comprising plaster of Paris and activated carbon, the water extract of said activated carbon having a pH of not less than 4 nor more than 10.

15. An orthopedic bandage suitable for use in the preparation of an orthopedic cast of sufficient strength to immobilize the portion of the body enclosed therein, comprising a thin, flexible, reenforcing material and a substantially dry mixture including plaster of Paris and activated carbon, the water extract of said activated carbon having a pH of not less than 4 nor more than 10, and a major portion of said activated carbon being capable of passing through a 100 mesh screen and containing not more than 10% soluble ash, said mixture when moistened with water having an acceptable wetting rate and workability, and being capable of hardening into a rigid mass having high deodorizing capacity and substantial permeability to air and moisture.

JOHN F. RYAN.

Certificate of Correction

Patent No. 2,402,779.  June 25, 1946.

JOHN F. RYAN

It is hereby certified that errors appear in the printed specification of the above numbered patent requiring correction as follows: Column 1, line 1, for "plastic" read *plaster*; line 19, for "Plastic" read *Plaster*; column 3, line 43, for "most" read *moist*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.* position comprising plaster of Paris, activated carbon and a binding agent, said cementitious composition having an acceptable wetting rate and workability.

11. An orthopedic bandage suitable for use in making orthopedic casts having high deodorizing capacity and substantial permeability to air and moisture comprising a textile fabric and a cementitious composition, said cementitious composition having an acceptable wetting rate and workability and comprising plaster of Paris and activated carbon.

12. An orthopedic bandage suitable for use in the preparation of an orthopedic cast of sufficient strength to immobilize the portion of the body enclosed therein comprising a thin, flexible reinforcing material and a substantially dry mixture including plaster of Paris and activated carbon, said mixture, when moistened with water having an acceptable wetting rate, workability, and setting time, and being capable of hardening into a rigid mass having high deodorizing capacity and substantial permeability to air and moisture.

13. An orthopedic bandage suitable for use in making orthopedic casts having a high deodorizing capacity and substantial permeability to air and moisture, comprising a textile fabric having adherent thereto a deodorizing cementitious composition comprising plaster of Paris, activated carbon, and a binding agent, the water extract of said activated carbon having a pH of not less than 4 nor more than 10, and said cementitious composition having acceptable wetting rate and workability.

14. An orthopedic bandage suitable for use in making orthopedic casts having high deodorizing capacity and substantial permeability to air and moisture, comprising a textile fabric and a cementitious composition, said cementitious composition having an acceptable wetting rate and workability and comprising plaster of Paris and activated carbon, the water extract of said activated carbon having a pH of not less than 4 nor more than 10.

15. An orthopedic bandage suitable for use in the preparation of an orthopedic cast of sufficient strength to immobilize the portion of the body enclosed therein, comprising a thin, flexible, reenforcing material and a substantially dry mixture including plaster of Paris and activated carbon, the water extract of said activated carbon having a pH of not less than 4 nor more than 10, and a major portion of said activated carbon being capable of passing through a 100 mesh screen and containing not more than 10% soluble ash, said mixture when moistened with water having an acceptable wetting rate and workability, and being capable of hardening into a rigid mass having high deodorizing capacity and substantial permeability to air and moisture.

JOHN F. RYAN.

Certificate of Correction

Patent No. 2,402,779.

June 25, 1946.

JOHN F. RYAN

It is hereby certified that errors appear in the printed specification of the above numbered patent requiring correction as follows: Column 1, line 1, for "plastic" read *plaster*; line 19, for "Plastic" read *Plaster*; column 3, line 43, for "most" read *moist*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.*